(12) United States Patent
Lu

(10) Patent No.: US 10,535,217 B2
(45) Date of Patent: Jan. 14, 2020

(54) AUTOMATIC MEDICATION DISPENSING DEVICE FOR BOTTLED MEDICATION

(71) Applicant: SUZHOU XINHENG AUTOMATION TECHNOLOGY CO., LTD., Suzhou, Jiangsu (CN)

(72) Inventor: Haiying Lu, Suzhou (CN)

(73) Assignee: SUZHOU XINHENG AUTOMATION TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 16/314,647

(22) PCT Filed: Jun. 29, 2017

(86) PCT No.: PCT/CN2017/090772
§ 371 (c)(1),
(2) Date: Dec. 31, 2018

(87) PCT Pub. No.: WO2018/001307
PCT Pub. Date: Jan. 4, 2018

(65) Prior Publication Data
US 2019/0333313 A1    Oct. 31, 2019

(30) Foreign Application Priority Data

Jun. 29, 2016 (CN) .......................... 2016 1 0489926

(51) Int. Cl.
*G07F 17/00* (2006.01)
*A61J 7/00* (2006.01)

(52) U.S. Cl.
CPC ........ *G07F 17/0092* (2013.01); *A61J 7/0076* (2013.01)

(58) Field of Classification Search
CPC ...... G07F 11/62; G07F 17/0092; G07F 11/00; G07F 11/04; G07F 11/06; G07F 11/52;
(Continued)

(56) References Cited

U.S. PATENT DOCUMENTS 5,704,516 A *  1/1998  Yuyama ............. B65G 47/1471
                                                221/164
5,860,563 A *  1/1999  Guerra .................. B65G 47/24
                                                221/172
(Continued)

FOREIGN PATENT DOCUMENTS

CN        102530457 A       7/2012
CN        103303625 A       9/2013
(Continued)

OTHER PUBLICATIONS

Oct. 11, 2017 International Search Report issued in International Patent Application No. PCT/CN2017/090772.

*Primary Examiner* — Gene O Crawford
*Assistant Examiner* — Ayodeji T Ojofeitimi
(74) *Attorney, Agent, or Firm* — Oliff PLC

(57) ABSTRACT

An automatic medication dispensing device for bottled medication includes a frame, a medication collection device and medication dispensing units; wherein: the bottled medications are arranged in a single column in the medication container; a medication outlet is set on the bottom wall at the medication discharging end of the medication container; the medication discharging mechanism includes a medication stopper and a push rod; the medication stopper is set at the medication outlet and one end of the medication stopper is hinged to the medication container, and the medication stopper has two working states of blocking the medication outlet and opening and a primary elastic element acts on the medication stopper; the drive device drives the primary pressing portion to act on the medication stopper and the secondary pressing portion acts on the first bottled medication at the medication discharging end.

6 Claims, 3 Drawing Sheets

(58) Field of Classification Search
CPC ......... G07F 11/58; B65B 43/44; B65H 19/12; B65H 2701/377; B65D 83/00; A61G 12/001
See application file for complete search history.

(56) References Cited

U.S. PATENT DOCUMENTS

| | | | | |
|---|---|---|---|---|
| 5,862,942 A * | 1/1999 | Yuyama | ................. | B65D 1/095 221/25 |
| 6,378,729 B1 * | 4/2002 | Kodama | ........... | B65G 47/1407 221/196 |
| 6,883,681 B1 * | 4/2005 | Coughlin | ............. | G07F 11/165 221/123 |
| 6,902,083 B1 * | 6/2005 | Michael | ................. | G07F 11/42 221/100 |
| 7,048,142 B1 * | 5/2006 | Michael | ................. | G07F 11/32 211/59.3 |
| 7,575,129 B2 * | 8/2009 | Yuyama | ................. | B65B 43/44 221/192 |
| 7,822,505 B2 * | 10/2010 | Yuyama | ................. | G06Q 50/22 221/127 |
| 7,988,400 B2 * | 8/2011 | Yuyama | ............... | B25J 15/0226 221/265 |
| 10,388,102 B2 * | 8/2019 | Wilson | ................... | G07F 11/06 |
| 10,414,576 B2 * | 9/2019 | Kim | ......................... | A61J 1/06 |
| 2001/0008984 A1 * | 7/2001 | Omura | ................... | G07F 11/04 700/241 |
| 2003/0089085 A1 * | 5/2003 | Shigeyama | ............. | G07F 11/44 53/425 |
| 2004/0094386 A1 * | 5/2004 | Yuyama | ................. | G07F 11/42 198/347.1 |
| 2004/0251266 A1 * | 12/2004 | Yuyama | ............... | B65G 59/062 221/251 |
| 2005/0098574 A1 * | 5/2005 | Yuyama | ................. | G07F 11/42 221/13 |
| 2005/0236418 A1 * | 10/2005 | Baker | ..................... | G07F 11/26 221/119 |
| 2006/0097001 A1 * | 5/2006 | Yuyama | ................. | G07F 11/165 221/130 |
| 2006/0113314 A1 * | 6/2006 | Yuyama | ................. | G07F 11/16 221/222 |
| 2007/0016327 A1 * | 1/2007 | Yuyama | ................. | G07F 9/026 700/231 |
| 2010/0164337 A1 * | 7/2010 | Yuyama | ............... | A61G 12/001 312/209 |
| 2010/0228392 A1 * | 9/2010 | Braun | ................. | A61G 12/001 700/242 |
| 2011/0000815 A1 * | 1/2011 | Yamashita | ............... | G07F 11/26 206/534.1 |
| 2015/0063956 A1 * | 3/2015 | King | ....................... | G07F 11/24 414/226.05 |
| 2015/0102052 A1 * | 4/2015 | Kim | ....................... | B65D 83/00 221/151 |
| 2015/0127145 A1 * | 5/2015 | Kim | ................... | G06F 19/3462 700/235 |
| 2016/0023874 A1 * | 1/2016 | Schraudolph | ............. | B67B 3/06 53/490 |
| 2016/0253860 A1 * | 9/2016 | Wilson | .................... | G07F 11/52 221/258 |

FOREIGN PATENT DOCUMENTS

| | | |
|---|---|---|
| CN | 103373572 A | 10/2013 |
| CN | 106144378 A | 11/2016 |
| CN | 206108131 U | 4/2017 |
| JP | 2000255718 A | 9/2000 |

* cited by examiner

AUTOMATIC MEDICATION DISPENSING DEVICE FOR BOTTLED MEDICATION

TECHNICAL FIELD

The present invention relates to an automated pharmacy, particularly to an automatic dispensing device for the bottled medication. The bottled medication includes the bottled medication such as injection or oral liquid.

BACKGROUND OF INVENTION

The bottled medication refers the bottled medication such as injection or oral liquid. In the traditional hospitals or pharmacies, the method of taking bottled medication is usually: when the patient gets the medication at the pharmacy, the pharmacist directly goes to the corresponding medication shelf to manually take the bottles according to the prescription. This kind of manual taking method is low in efficiency, error-prone, labor-intensive, and long waiting time for patients.

On the current market, most of the automatic medication dispensing devices are only suitable for boxed or bagged medication. The automatic medication dispensing devices for the bottled medication are few and the inventor of the present invention conducted many years of research on the automatic medication dispensing device for bottled medication and applied for the relevant patent in 2012. Refer to the patent literature entitled "Automated Pharmacy of Bottled Injection" with the publication number CN103373572A. The patent literature discloses an automated pharmacy for bottled injection, which comprises a frame body and a plurality of medication dispensing units composed of a medication container (referred to as a medication storage pocket in this patent literature) and a medication discharging mechanism (referred to as a sorting device in this patent literature). The medication container has many bottled injections in it and the medication container is tilted and set with a medication outlet at the bottom, while a medication discharging mechanism is set at the medication outlet; the medication discharging mechanism specifically includes a sorting turntable, and the spacing between adjacent sawteeth on the sorting turntable corresponds to the size of the bottled injection. During the operation, the bottled injection is conveyed from the medication outlet of the medication container by the rotation of the sorting turntable. The solution disclosed in the above patent literature can realize automatic medication dispensing, but there are still some shortcomings: as a lot of (multiple rows and columns) bottled injections are placed in the medication container, the blocking is prone to happen during the process of adjacent sawteeth of sorting turntable driving the bottled injection, resulting in the unsmooth medication dispensing and the vacancy often happens in the placement position between the sawteeth of sorting turntable, and a detection device is required and the cost is increased.

DISCLOSURE OF THE INVENTION

It is an object of the present invention to provide an automatic medication dispensing device for bottled medication, which improves the reliability of the medication dispensing and reduces the cost.

In order to achieve the above object, the technical solution adopted by the present invention is: an automatic medication dispensing device for bottled medication comprises a frame, a medication collection device and a plurality of medication dispensing units arranged on the frame; the medication dispensing unit comprises a long medication container, and one end of the medication container is the medication discharging end and the medication discharging mechanism is set at the medication discharging end;

The medication container comprises two opposite side walls and a bottom wall connected between the bottom edges of the two side walls; the spacing between the two side walls corresponds to the bottle width of the bottled medication and two side walls block the two sides of bottled medication in the width direction, while the bottom wall blocks the bottom or the top of the bottle, so that the bottled medications are arranged in a single column in the medication container; a medication outlet is set on the bottom wall at the medication discharging end of the medication container;

the medication discharging mechanism comprises a medication stopper and a push rod; the medication stopper is set at the medication outlet and one end of the medication stopper is hinged to the medication container, and the medication stopper has two working states of blocking the medication outlet and opening and a primary elastic element acts on the medication stopper and the elastic force of the primary elastic element forces the medication stopper to maintain the working state of blocking the medication outlet; the push rod is slideably set along the up and down direction above the medication outlet and the push rod is equipped with a primary pressing portion in relative to the bottled medication and the push rod is also equipped with a secondary pressing portion acting on the medication stopper in the downward extension; the push rod is connected to a drive device and the drive device drives the push rod to make the primary pressing portion act on the medication stopper and the secondary pressing portion acts on the first bottled medication at the medication discharging end to finally make the bottled medication fall through the medication outlet.

The medication collection device is set under the medication outlet in relative to each medication dispensing unit to accommodate the bottled medication from the medication dispersing unit.

In above described technical solution, the medication dispensing units are arranged in a matrix of multiple rows and columns on the frame, the dispensing ends of all medication dispensing units are on the same side, the medication collection device comprises a lateral conveying line and longitudinal conveying line and the lateral conveying line comprises two driving wheels and a conveying belt between the two driving wheels; each lateral conveying line is set under the medication outlet in relative to the dispensing end of each row of the medication dispensing unit and the bottled medication falls onto the conveying belt; the longitudinal conveying line comprises two driving wheels, the transmission chain or transmission belt between two driving wheels and the support plates set on the transmission chain or transmission belt at intervals; the longitudinal conveying line is connected with each lateral conveying line and the bottled medication conveyed by each lateral conveying line falls onto the support plate of the longitudinal conveying line.

In above described technical solution, the medication container is equipped with a pushing slider in it and the pushing slider is slideably set along the length direction of the medication container and the pushing slider acts on the bottled medication by the gravity or elastic force acts to push the bottled medication to the medication discharging end.

In above described technical solution, at least one of the two side walls of the medication container is equipped with an adjustable baffle, and the adjustable baffle could extend upward and it's equipped with a pressing action portion pressing the head or shoulder of bottled medication on its top; the adjustable baffle could be moved in the up and down direction in relative to the medication container to correspond to the heights of different bottled medication.

In above described technical solution, two inner sides of the medication container are equipped with an adjustable side wall each and the two adjustable side walls could be moved along the connection direction of two side walls of the medication container to make the distance between two adjustable side walls change and correspond to the widths of different bottled medication.

In above described technical solution, the drive device is a motor and the motor is connected with the push rod through the rocker mechanism of the crank.

The working principle and effect of the present invention are as follows: the present invention specially designs the medication dispensing unit, which could dispense the bottled medication one by one, and the medication collection device could collect and output the bottled medication fallen onto each medication dispensing unit. Each medication dispensing unit could dispense the different types and different sizes of bottled medication. It could realize the fully automatic sorting and dispensing of bottled medication through the control of the drive device of each medication dispensing unit. Since the bottled medication in the medication container of the medication dispensing unit of the present invention is arranged in a single row and the special medication discharging mechanism is used, it greatly improves the reliability of dispensing the bottled medication and the manufacturing cost is not high.

Figure 1:
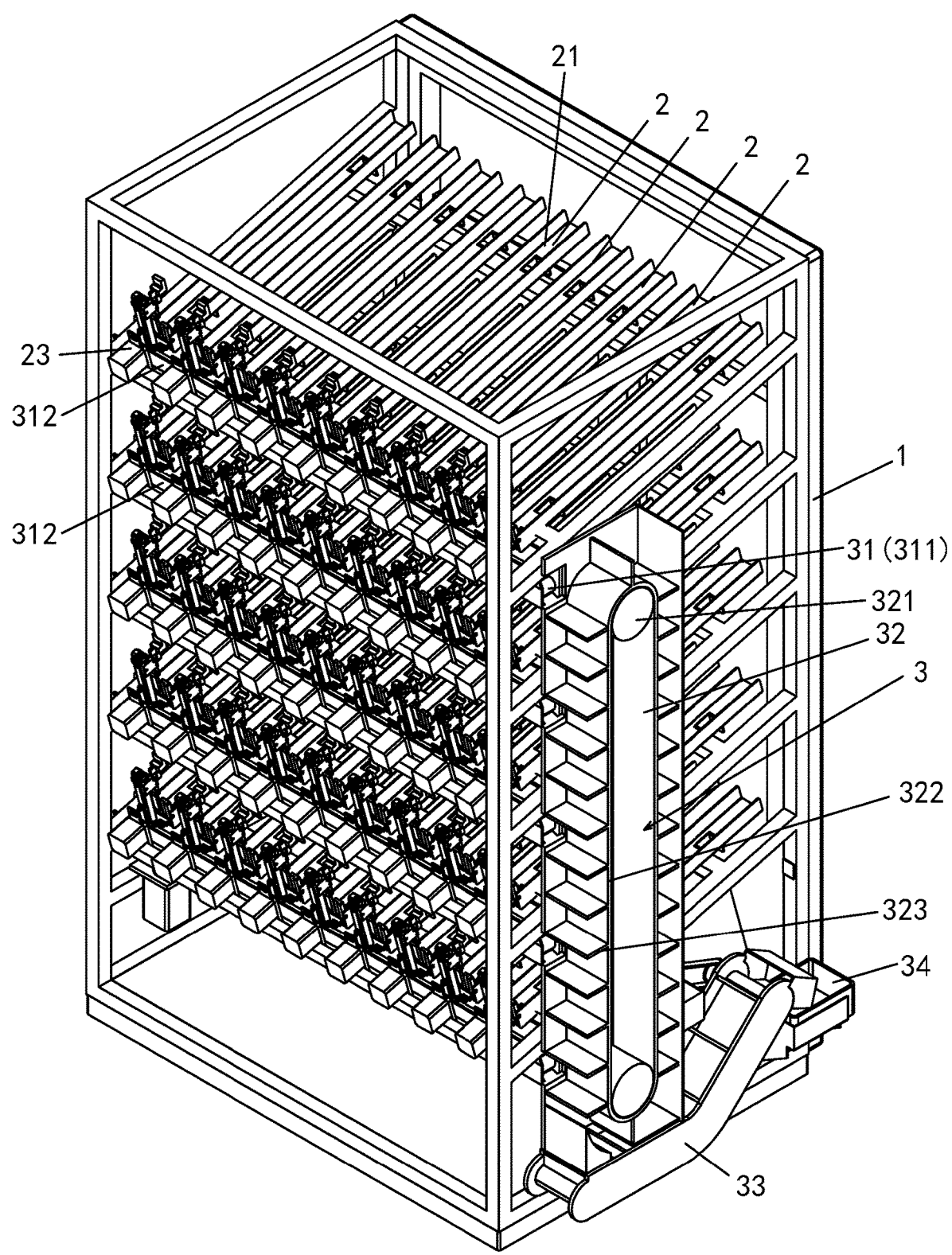
FIG. 1 is the perspective schematic view of embodiment of present invention.

In the above figures: 1. Frame; 2. Medication dispersing unit; 21. Medication container; 211. Side wall; 212. Side wall; 2121. Adjustable baffle; 21211. Pressing action portion; 213. Bottom wall; 214. Guide rod; 2141. Guide groove; 22. Medication outlet; 23. medication discharging mechanism; 231. Medication stopper; 2321. Primary pressing portion; 2322. Secondary pressing portion; 2323. Roller; 233. Drive device; 234. Crank; 235. Connecting rod; 236. Primary elastic element; 3. Medication collection device; 31. Lateral conveying line; 311. Driving wheel; 312 Conveying belt; 32. Longitudinal conveying line; 321. Driving wheel; 322. Conveying belt; 323. Support plate; 33. Bottom conveying line; 34. Medication box placement position; 4. Bottled Medication.

Specific Embodiment

With reference to the accompanying drawings and embodiment, the present invention will be described in detail.

Embodiment: Refer to FIG. 1 and FIG. 2-4

An automatic medication dispensing device for bottled medication comprises a frame 1, a medication collection device 3 and a plurality of medication dispensing units 2 arranged on the frame 1. The medication dispensing unit 2 comprises a long medication container 21, and one end of the medication container 21 is the medication discharging end and the medication discharging mechanism 23 is set at the medication discharging end.

The medication container 21 is a groove-shape body with the opening on the top as shown in the figure and it particularly comprises two opposite side walls 211, 212 and a bottom wall 213 connected between the bottom edges of the two side walls 211, 212; the spacing between the two side walls 211, 212 corresponds to the bottle width of the bottled medication 4 and two side walls 211, 212 block the two sides of bottled medication 4 in the width direction, while the bottom wall 213 blocks the bottom of the bottle or the top of the bottle, so that the bottled medications 4 are arranged in a single column in the medication container 1.

A medication outlet 22 is set on the bottom wall 213 at the medication discharging end of the medication container 21.

The medication discharging mechanism 23 comprises a medication stopper 231 and a push rod 232; the medication stopper 231 is set at the medication outlet 22 and the medication stopper 231 has two working states of blocking the medication outlet 22 and opening. The push rod 232 is slideably set along the up and down direction above the medication outlet 22 and the push rod 232 is connected to a drive device 233 and the drive device 233 drives the push rod 232 to act on the medication stopper 231 and act on the first bottled medication 4 at the medication discharging end to make the bottled medication 4 fall through the medication outlet 22.

The medication collection device 3 is set under the medication outlet 22 in relative to each medication dispensing unit 2 to accommodate the bottled medication 4 from the medication dispersing unit 2.

Figure 2:
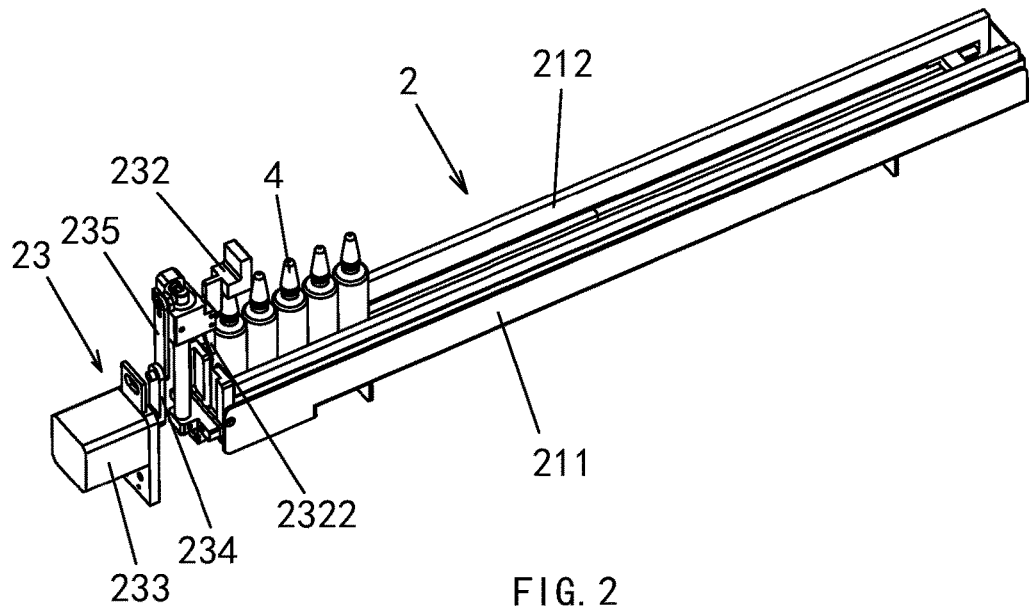
FIG. 2 is the perspective view of the medication dispersing unit of the embodiment of present invention.
Figure 3:
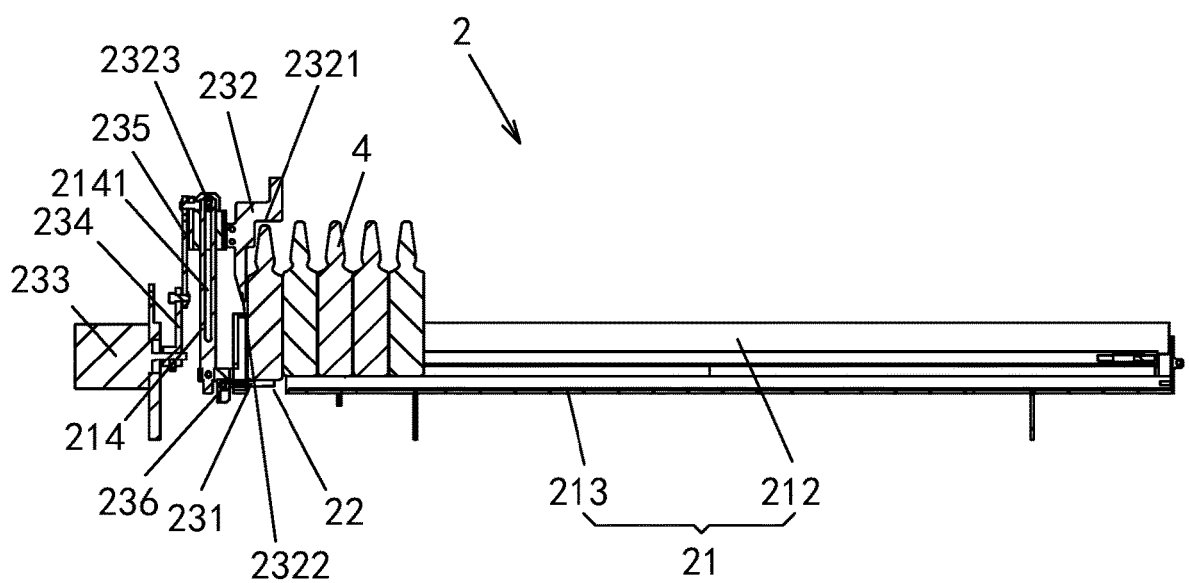
FIG. 3 is the cross-sectional view of the medication dispersing unit of the embodiment of present invention.

The drive device 233 preferably uses a motor and the transmission mechanism comprises a crank 234 and a connecting rod 235. One end of the crank 234 is connected with the drive motor and the other end of the crank 234 is hinged to one end of the connecting rod 235, while the other end of the connecting rod 235 is hinged to the push rod 232. Specifically, as shown in FIG. 2 and FIG. 3, the medication container is set with a vertical guide rod 214 and the guide rod 214 is set with a guide groove 2141. The push rod 232 is set with a roller 2323 and the roller 2323 is embedded in the guide groove 2141 for guide cooperation.

One end of the medication stopper 231 is hinged to the medication container 21 and a primary elastic element 236 acts on the medication stopper 231 and the elastic force of the primary elastic element 236 forces the medication stopper 231 to maintain the working state of blocking the medication outlet 22. The push rod 232 is equipped with a primary pressing portion 2321 in relative to the bottled medication 4 and the push rod 232 is also equipped with a secondary pressing portion 2322 acting on the medication stopper 231 in the downward extension to make the push rod act on the medication stopper 231 and act on the first bottled medication 4 at the medication discharging end to make the bottled medication 4 fall through the medication outlet 22.

Of course, the above is only a preferred example. In practice, the push rod 232 can be connected to the drive device 233 by other types of transmission mechanisms, and the drive device 233 can also use a cylinder.

The medication dispensing unit 2 is arranged on the frame 1 in a horizontal direction along the lengthwise direction of the medication dispensing unit 21 or at an angle of less than 80° with respect to the horizontal direction. As shown in the FIG. 1, it's preferable that the medication dispensing unit 2 is arranged on the frame 1 at an angle of 10°-20° between the lengthwise direction of the medication container 21 and the horizontal direction with the dispensing end tilting downward. Due to this design, when the first bottled medication 4 is dispensed from the dispensing end, the bottled medication 4 in the medication container 21 will automatically slide to the dispensing end due to gravity. In practice, it is also feasible to keep the medication dispensing unit 2 horizontal or make the dispensing end tilt upward, but it is necessary to add an external force to push the bottled medication 4 to the dispensing end. The particular solution is: the medication container 21 is equipped with a pushing slider in it and the pushing slider is slideably set along the length direction of the medication container 21 and the pushing slider 21 or elastic force acts on the bottled medication 4 to push the bottled medication 4 to the medication discharging end.

Figure 4:
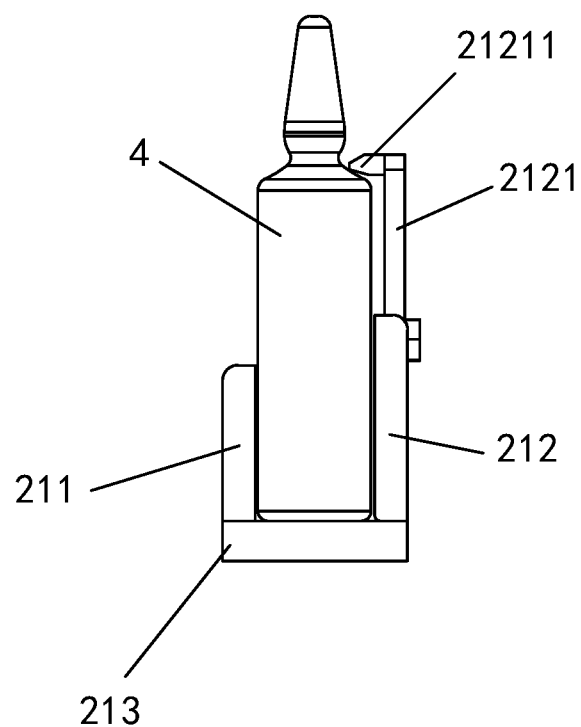
FIG. 4 is the cross-sectional view of the medication container of medication dispersing unit of the embodiment of present invention.

As shown in FIG. 4, at least one of the two side walls 211, 212 of the medication container 21 is equipped with an adjustable baffle 2121, and the adjustable baffle 2121 could extend upward and it's equipped with a pressing action portion 21211 pressing the head or shoulder of bottled medication 4 on its top. The bottled medication 4 as shown in FIG. 2-4 is the glass bottled injection and it has the obvious shoulder, and the pressing action portion 21211 presses the shoulder of the bottled medication 4 and the adjustable baffle 2121 could be moved in the up and down direction in relative to the medication container 21 to correspond to the heights of different bottled medication 4.

Two inner sides of the medication container 21 are equipped with an adjustable side wall each (not indicated in the Figure) and the two adjustable side walls could be moved along the connection direction of two side walls of the medication container 21 in relative to the medication container 21 to make the distance between two adjustable side walls change and correspond to the widths of different bottled medication.

As illustrated in FIGS. 2-4, the bottled medication 4 contacts the bottom wall 213 with its bottle bottom, and in practice, it is also possible to invert the bottled medication 4 by placing the top of the bottled medication 4 down, and the bottom wall 213 is used for blocking the top of the bottled medication 4.

In practice, the medication container 21 may be a tubular channel body in addition to the above groove-shape body with the opening on the top, that is, the medication container 21 could comprise a top wall connected between the top edges of two side walls 211, 212 in addition to two opposite side walls 211, 212 and a bottom wall 213 connected between the bottom edges of the two side walls 211, 212.

As illustrated in FIG. 1, the medication dispensing units 2 are arranged in a matrix of multiple rows and columns on the frame 1, the dispensing ends of all medication dispensing units 2 are on the same side, the medication collection device 3 comprises a lateral conveying line 31 and longitudinal conveying line 32 and the lateral conveying line 31 comprises two driving wheels 311 and a conveying belt 312 between the two driving wheels 311. Each lateral conveying line 31 is set under the medication outlet 22 in relative to the dispensing end of each row of the medication dispensing unit 2 and the bottled medication 4 falls onto the conveying belt 312. The longitudinal conveying line 32 comprises two driving wheels 321, the transmission chain or transmission belt 322 between two driving wheels 321 and the support plates 323 set on the transmission chain or transmission belt 322 at intervals; the longitudinal conveying line 32 is connected with each lateral conveying line 31 and the bottled medication 4 conveyed by each lateral conveying line 31 falls onto the support plate 323 of the longitudinal conveying line 32. As shown in FIG. 1, the medication collection device 3 also comprises a bottom conveying line 33 and one end of the bottom conveying line 33 is connected to the lower end of the longitudinal conveying line 32 and the other end is connected to a medication box placement position 34.

Actually, the medication collection device 3 can have various changes, for example, the medication collection device 3 could also be a movable tray, and when a medication dispensing unit 2 is dispensing the medication, the tray is moved to its lower side.

Before the operation, load the bottled medication 4 in the medication container 21 of each medication dispensing unit in order and load the medication box in the medication box placement position 34.

During the operation, control the running of the drive device 233 of the medication discharging mechanism 23 of corresponding medication dispensing unit 2 according to the prescription to press the push rod 232 down and the push rod 232 not only presses the medication stopper 231 to turn over and open, but also presses down the first bottled medication 4 at the dispensing end to make the first bottled medication 4 at the dispensing end fall onto the conveying belt 312 of the lateral conveying line 31, and the second bottled medication 4 behind the first bottled medication 4 automatically fills the gap due to gravity or external force and the push rod 232 could continue to press down the second bottled medication 4 until the desired amount on the prescription is reached; at the same time, the conveying belt 312 of the lateral conveying line 31 moves to convey the bottled medication 4 to the longitudinal conveying line 32 and the longitudinal conveying line 32 conveys it downward to the bottom conveying line 33, then the bottom conveying line 33 conveys it to the medication box in the medication box placement position 34 until the bottled medication 4 on the prescription is sorted and dispensed.

This embodiment realizes the automatic sorting and dispensing of the bottled medication, and has high operation reliability.

It should be noted that the above described embodiments are only for illustration of technical concept and characteristics of present invention with purpose of making those skilled in the art understand the present invention, and thus these embodiments shall not limit the protection range of present invention. The equivalent changes or modifications according to spiritual essence of present invention shall fall in the protection scope of present invention.

The invention claimed is:
1. An automatic medication dispensing device for bottled medication comprises a frame, a medication collection device and a plurality of medication dispensing units arranged on the frame; the medication dispensing unit comprises a long medication container, and one end of the medication container is the medication discharging end and a medication discharging mechanism is set at the medication discharging end; wherein:
the medication container comprises two opposite side walls and a bottom wall connected between the bottom edges of the two side walls; the spacing between the two side walls corresponds to the bottle width of the bottled medication and two side walls block the two sides of bottled medication in the width direction, while the bottom wall blocks the bottom or the top of the bottled medication, so that the bottled medications are arranged in a single column in the medication container;

a medication outlet is set on the bottom wall at the medication discharging end of the medication container;

the medication discharging mechanism comprises a medication stopper and a push rod; the medication stopper is set at the medication outlet and one end of the medication stopper is hinged to the medication container, and the medication stopper has two working states of blocking the medication outlet and opening and a primary elastic element acts on the medication stopper and the elastic force of the primary elastic element forces the medication stopper to maintain the working state of blocking the medication outlet; the push rod is slideably set along the up and down direction above the medication outlet and the push rod is equipped with a primary pressing portion in relative to the bottled medication and the push rod is also equipped with a secondary pressing portion acting on the medication stopper in the downward extension; the push rod is connected to a drive device and the drive device drives the push rod to make the primary pressing portion act on the medication stopper and the secondary pressing portion acts on the first bottled medication at the medication discharging end to finally make the bottled medication fall through the medication outlet;

the medication collection device is set under the medication outlet in relative to each medication dispensing unit to accommodate the bottled medication from the medication dispersing unit.

2. The automatic medication dispensing device for bottled medication according to claim 1, wherein: the medication dispensing units are arranged in a matrix of multiple rows and columns on the frame, the dispensing ends of all medication dispensing units are on the same side, the medication collection device comprises a lateral conveying line and longitudinal conveying line and the lateral conveying line comprises two driving wheels and a conveying belt between the two driving wheels; each lateral conveying line is set under the medication outlet in relative to the dispensing end of each row of the medication dispensing unit and the bottled medication falls onto the conveying belt; the longitudinal conveying line comprises two driving wheels, the transmission chain or transmission belt between two driving wheels and the support plates set on the transmission chain or transmission belt at intervals; the longitudinal conveying line is connected with each lateral conveying line and the bottled medication conveyed by each lateral conveying line falls onto the support plate of the longitudinal conveying line.

3. The automatic medication dispensing device for bottled medication according to claim 1, wherein: the medication container is equipped with a pushing slider in it and the pushing slider is slideably set along the length direction of the medication container and the pushing slider acts on the bottled medication by the gravity or elastic force acts to push the bottled medication to the medication discharging end.

4. The automatic medication dispensing device for bottled medication according to claim 1, wherein: at least one of the two side walls of the medication container is equipped with an adjustable baffle, and the adjustable baffle could extend upward and it's equipped with a pressing action portion pressing the head or shoulder of bottled medication on its top; the adjustable baffle could be moved in the up and down direction in relative to the medication container to correspond to the heights of different bottled medication.

5. The automatic medication dispensing device for bottled medication according to claim 1, wherein: two inner sides of the medication container are equipped with an adjustable side wall each and the two adjustable side walls could be moved along the connection direction of two side walls of the medication container in relative to the medication container to make the distance between two adjustable side walls change and correspond to the widths of different bottled medication.

6. The automatic medication dispensing device for bottled medication according to claim 1, wherein: the drive device is a motor and the motor is connected with the push rod through a rocker mechanism of a crank.

* * * * *